Patented July 22, 1930

1,771,378

UNITED STATES PATENT OFFICE

HENRY B. HIGGINS, OF PITTSBURGH, PENNSYLVANIA, ASSIGNOR TO PITTSBURGH PLATE GLASS COMPANY, A CORPORATION OF PENNSYLVANIA

TRANSPARENT GLASS PLATE

No Drawing. Application filed April 21, 1925. Serial No. 24,866.

The invention relates to transparent glass plates or sheets for use in glazing, or in mirrors, or as a covering for pictures and the like. It has for its objects the provision of a form of plate which may be used to advantage in place of ordinary plate glass for certain purposes, but which may be produced at a much less cost. Heretofore, two varieties of glass have been employed for the purposes above set forth, one being what is known as "window glass," or "sheet glass," and the other what is known as "plate glass."

Window glass is produced by a drawing operation, either in the form of cylinders which are flattened and cut up, or in the form of a continuous sheet by the well known Colburn (U. S. Patent No. 1,248,809) and Fourcault (U. S. Patent No. 901,800) processes. This form of glass has a natural fire finish or polish, so that it requires no mechanical surfacing, and for this reason is relatively cheap. It has the disadvantage, however, that the surfaces although highly polished are not optically true, so that the surface presents a wavy appearance with reflected light when viewed at an angle, and also has the further objection, when used in glazing, that there is a distortion in the appearance of objects viewed through it at an angle.

Plate glass is produced by a casting or a rolling operation, so that the surfaces are roughened or marred and require grinding and polishing. The rough glass is ground till it is flat and true upon rotating tables over which grinding runners are mounted, abradants comprising sand and emery being successively employed for this purpose. The glass which is thus given a perfectly flat true surface, is then polished upon the same rotating table by the use of runners faced with felt to which rouge is supplied. This gives the glass a brilliant luster. The surfaces thus produced not only have the luster of the fire finished window glass, but in addition are optically true. That is, the face of the sheet when viewed at an angle shows a perfectly plane uniform surface without waves, and when objects are viewed through the glass at an angle, there is no distortion. Plate glass, therefore, is much superior in appearance to window glass and is required wherever trueness of vision is a controlling factor. Its cost per foot, however, is many times that of window glass, due to the expense of grinding and polishing, so that its field of use is greatly restricted.

It is the purpose of the present invention to provide glass sheets, which in cost lie between that of window glass and plate glass and which have many of the advantages incident to plate glass, rendering the glass greatly superior to window glass, so that it can be used to advantage in locations where window glass is clearly unsuitable, and in which the cost of plate glass makes it prohibitive. In producing the improved glass, relatively heavy drawn glass, fire finished on both sides, is employed, such glass being produced either by a cylinder process, or by a continuous sheet drawing process, such as that of Colburn or Fourcault. This glass is placed upon the ordinary plate glass grinding table and ground and polished on one side only, just as heretofore described in connection with the surfacing of plate glass, or it may be ground and polished in a continuous straight away process, such as has been recently developed in the art.

In using the glass, as thus produced, for pictures, the ground and polished face is placed facing out, so that when viewed at an angle with reflected light, an optically true surface is presented to the observer, and it is difficult to distinguish the glass from plate glass under these conditions. When used for glazing, the glass is also arranged with the ground and polished side upon the exterior, so that the building or conveyance in which the glass is used, has the appearance of being glazed with plate glass, rather than window glass. Viewed from the inside, also, the glass presents a much better appearance than ordinary window glass, as the fact that one side is optically true very materially reduces the distortion apparent to an observer when looking through the glass at an angle. When used for mirrors, the ground and polished side will be used facing inward, as it is this side which provides the reflecting surface. The glass may also be used to advantage in making composite wind shields of the so-called "splinterless" glass. This glass is now made of thin sheets of plate glass cemented to an interposed sheet of celluloid or some other tough transparent material. In applying the improvement in this relation, the glass sheets have their fire polished surfaces next to the celluloid. A composite sheet thus made is much cheaper than one made from glass sheets ground and polished on both sides, and at the same time is very difficult to distinguish from such more expensive glass.

What I claim is:

1. As a new article of manufacture, a composite sheet consisting of a pair of opposing plates of drawn glass, each having upon one side a natural finish, and having the other side ground and polished, and an interposed sheet of tough transparent material, the natural-finished sides of the glass plates facing inward and being attached to said tough transparent sheet.

2. As a new article of manufacture, a composite sheet consisting of a pair of opposing plates of drawn glass, each having upon one side a natural fire finish, and having the other side ground and polished, and an interposed sheet of celluloid, the fire-finished sides of the glass plates facing inward and being cemented to said celluloid sheet.

3. As a new article of manufacture, a composite sheet consisting of a pair of opposing plates of glass, each having upon one side a natural finish, and having the other side ground and polished, and an interposed sheet of tough, transparent material, the natural finished sides of the glass plates facing inward and being attached to said tough, transparent sheet.

In testimony whereof, I have hereunto subscribed my name, this 17th day of April, 1925.

HENRY B. HIGGINS.